March 24, 1959     T. J. BUSCH     2,878,695
TOOL HOLDER FOR BORING BARS
Filed Jan. 29, 1958

INVENTOR.
THOMAS J. BUSCH
BY
RICHEY, WATTS, EDGERTON,
McNENNY & FARRINGTON
AH Edgerton
ATTORNEYS

2,878,695
TOOL HOLDER FOR BORING BARS

Thomas J. Busch, Macedonia, Ohio, assignor to Maxwell Industries, Inc., Macedonia, Ohio, a corporation of Ohio Application January 29, 1958, Serial No. 712,004

3 Claims. (Cl. 77—58)

This invention relates broadly to boring bars and more specifically to improvements in cutting tool holders therefor.

The object of the invention is to provide a cutter holder for carbide tips of the throw-away type, i.e., preground tips that may be discarded, when dull, rather than reground.

Other objects of the invention reside in the provision of a mechanical clamp for holding carbide boring or reaming cutters which is economic of manufacture, efficient of operation and designed to facilitate replacement of the tips with accuracy, ease and dispatch.

Other objects and advantages more or less ancillary to the foregoing, and the manner in which all the various objects are realized, will appear in the following description, which considered in connection with the accompanying drawings, sets forth the preferred embodiment of the invention.

Referring to the drawings.

Figure 1:
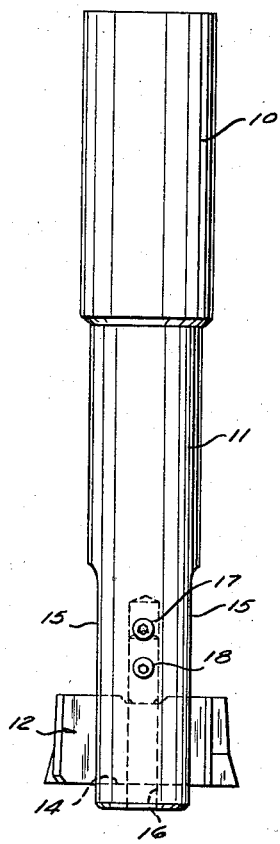
Fig. 1 is a side elevational view of a boring bar having the improved cutting tool holder therein.
Figure 2:
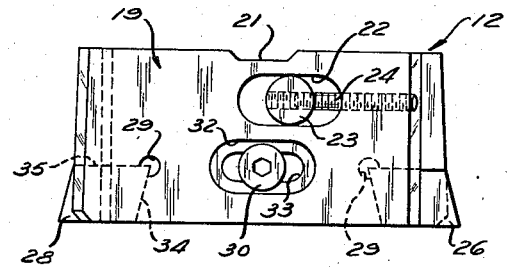
Fig. 2 is a plan view of the tool holder including the carbide tips and clamp therefor.
Figure 3:
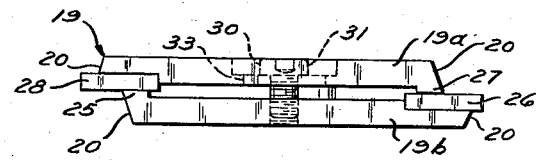
Fig. 3 is a side elevational view thereof.
Figure 4:
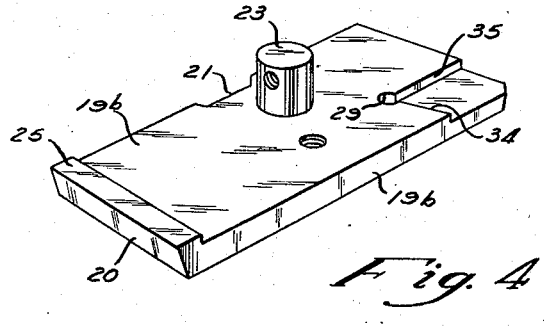
Fig. 4 is a perspective view of one of the clamping members.

Referring first to Fig. 1, the boring bar is of the usual form which embodies a shank 10, a lineal section 11 and a cutter holder 12 adjacent the end thereof. The holder 12 is mounted for floating movement in a cross slot 14 and the lineal section 11 is formed with flattened lands 15 on opposed sides thereof normal to the cross slot 14. The end portion of the section 11 is axially bored for a locating pin 16 and is cross drilled and tapped for an adjusting screw 17 formed with a conical end thereon which is engaged with the end of the pin 16. A lock screw 18 is provided in the holder to clamp the pin in its adjusted position. The cutter holder comprises a pair of similar superposed rectangular plates 19 each machined with beveled ends 20 to provide clearance for the tool within a bore in a workpiece, and a notch 21 in the center of the lineal edges thereof to receive the locating pin 16. The upper plate 19a is formed with a slot 22 therein to accommodate a post 23 that is rigidly mounted in the lower plate 19b. The post is cross drilled and tapped for a screw 24 threaded in the upper plate to facilitate lineal adjustment thereof. The lower plate is formed with an undercut throughout the major portion of its length to define a ledge 25 in one end thereof and the opposed end of the undercut portion of the plate is recessed in one corner thereof for the reception of a square or diamond shaped carbide cutter 26. The upper plate 19a is of similar form having an undercut in the lower face thereof that defines a ledge 27 on one end thereof and a recess in the corner of the opposed end thereof configured to receive a second carbide cutter 28. The recesses for the cutters 26 and 28 are end milled, the end mill being disposed to intersect holes 29 drilled in the faces of the plates. The plates 19 are clamped together by a machine screw 30 threaded in the bottom plate 19b with the head 31 thereof seated in a counterbore 32 in the edge of a slot 33 in the top plate 19a.

The thrust imposed upon the cutters 26 and 28 is directed inwardly and is resisted by the frictional engagement of the plates 19 and by the shoulders 34 and 35 that form the inner boundary of the seats or recesses for the carbide cutting tools. In practice, it has been found that a clamp of this character provides adequate anchorage for the cutters, and the cost of resharpening the carbide tools is far greater than the initial cost thereof, hence, when they become worn it is cheaper to throw them away rather than to regrind the hard carbide material.

Although square and diamond shaped carbide cutters are referred to above, it is to be understood that circular or polygonal cutters with mating shoulders 34 and 35 in the plates 19a and 19b may be used with equal facility.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A carbide cutting tool holder comprising a boring bar having a rectangular slot adjacent one end thereof, a pair of rectangular plates disposed in superposed overlapped relation in said slot, each plate having a rectangular depression in a corner of the mating face thereof, one of the said depressions being disposed in the mating face of one side of first plate, the other depression being disposed in the mating face of the opposite side of the second plate, a ledge on a face of one end of each of said plates, a rectangular carbide cutting tool in each of said depressions, said ledges on said plates being engaged respectively by said carbide cutting tools, a post on one of said plates having a tapped cross bore therein, the second plate having a slot therein for the reception of said post, a screw in the threaded bore in said post and in the body of the second plate, the first named plate having a tapped hole therein, a screw in said hole, a head on the last named screw, said second plate having a second slot therein and an elongated counterbore in a face thereof for the reception of the head of said screw, and means in the medial axis of said boring bar for clamping said plates within said slot in said bar.

2. In a boring bar having a rectangular slot adjacent one end thereof, a carbide cutting tool holder therefor comprising a pair of rectangular plates disposed in overlapped relation with each other in said slot, each plate having a rectangular depression in a corner of the mating faces thereof, said depression being disposed in the mating face of one side of the first plate, the depression in the second plate being disposed in the mating face of the opposite side of the second plate, a ledge on one end of each of said plates, a rectangular carbide cutting tool in each depression, the end and one side of said carbide cutting tools overhanging the corner of said plates, respectively, beveled edges on said overhanging portions of said cutting tool, said ledges on each of said plates being engaged, respectively, with said carbide cutting tools, a post on the first named plate having a tapped cross bore therein, the second plate having a slot therein for the reception of said post, a screw in the tapped bore in said post and in the body of the second plate, the first named plate having a tapped hole therein, a screw in said hole, a head on the last named screw, said second plate having a second slot therein and an elongated counterbore in the upper face thereof for the reception of the head of said screw, and means in the medial axis of said boring bar for clamping said plates within said slot in said bar.

3. A carbide cutting tool holder comprising a boring bar having a rectangular slot adjacent one end thereof, a pair of rectangular plates disposed in superposed overlapped relation with each other in said slot, each plate having a rectangular depression in the opposite corners of the forward end of the mating face thereof, one of said depressions being disposed in the mating face of one side of the first plate, the other depression being disposed in the mating face of the opposite side of the second plate, ribs on the forward ends of each of said plates, rectangular carbide cutting tools in each of said depressions, said ribs on said plates being engaged, respectively, with said carbide cutting tools, a post on the lower plate having a tapped cross bore therein, the second plate having a slot therein for the reception of said post, a screw in the tapped bore in said post and in the body of said second plate to accommodate lineal adjustment of said plates, the first plate having a tapped hole therein, a screw in said hole, a head on the last named screw, said upper plate having a second slot therein and an elongated counterbore in the upper face thereof for the reception of the head of said screw to hold said plates in clamped relation with each other, and means in the medial axis of said boring bar for clamping said plates within said slot.

References Cited in the file of this patent

UNITED STATES PATENTS

| 2,649,818 | Kaiser | Aug. 25, 1953 |
| 2,811,056 | Hutto | Oct. 29, 1957 |

FOREIGN PATENTS

| 245,751 | Switzerland | Aug. 16, 1947 |
| 667,676 | Great Britain | Mar. 5, 1952 |
| 843,199 | Germany | July 7, 1952 |